United States Patent
Ho (10) Patent No.: US 8,422,405 B2
(45) Date of Patent: Apr. 16, 2013

(54) MOBILE SWITCHING CENTER PLATFORM HAVING INTERFACES WITH FUNCTIONALITIES DEFINED BY AN ARCHITECTURE THAT PROVIDES PACKET-SWITCHED MULTIMEDIA SUBSCRIBER SERVICES

(75) Inventor: Pui Sze Stephanie Ho, Euless, TX (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 12/920,355

(22) PCT Filed: Mar. 17, 2009

(86) PCT No.: PCT/US2009/037397
§ 371 (c)(1),
(2), (4) Date: Aug. 31, 2010

(87) PCT Pub. No.: WO2009/117413
PCT Pub. Date: Sep. 24, 2009

(65) Prior Publication Data
US 2011/0032923 A1    Feb. 10, 2011

Related U.S. Application Data

(60) Provisional application No. 61/037,220, filed on Mar. 17, 2008.

(51) Int. Cl.
*H04L 12/16* (2006.01)
*H04L 12/66* (2006.01)

(52) U.S. Cl.
USPC .......................................... 370/260; 370/352

(58) Field of Classification Search .......... 370/206–263, 370/352, 328
See application file for complete search history.

(56) References Cited

U.S. PATENT DOCUMENTS

| | | | |
|---|---|---|---|
| 6,954,654 B2 | 10/2005 | Ejzak | |
| 2003/0027569 A1 | 2/2003 | Ejzak | |
| 2006/0030357 A1 | 2/2006 | McConnell et al. | |
| 2006/0286984 A1* | 12/2006 | Bonner | 455/445 |
| 2007/0297390 A1 | 12/2007 | Skog et al. | |
| 2008/0299958 A1* | 12/2008 | Buckley et al. | 455/417 |
| 2009/0093249 A1* | 4/2009 | Zhu et al. | 455/433 |
| 2010/0098040 A1* | 4/2010 | Chu et al. | 370/338 |
| 2010/0255864 A1* | 10/2010 | Alfano et al. | 455/466 |
| 2011/0009120 A1* | 1/2011 | You et al. | 455/436 |

* cited by examiner

*Primary Examiner* — Andrew Lee (57) ABSTRACT

A mobile switching center platform includes a circuit-switched switch to establish circuit-switched communications sessions on behalf of at least one wireless terminal. The mobile switching platform further includes interfaces having functionalities defined by an architecture that provides packet-switched multimedia subscriber services, wherein at least one of the interfaces is to enable the mobile switching center platform to communicate with a packet-switched subscriber access network through which the mobile switching center platform establishes packet-switched communications sessions with at least one terminal device.

15 Claims, 4 Drawing Sheets

MOBILE SWITCHING CENTER PLATFORM HAVING INTERFACES WITH FUNCTIONALITIES DEFINED BY AN ARCHITECTURE THAT PROVIDES PACKET-SWITCHED MULTIMEDIA SUBSCRIBER SERVICES

CROSS REFERENCE TO RELATED APPLICATIONS

This application is a national stage application under 35 U.S.C. §371 of PCT/US09/37397, filed on Mar. 17, 2009, which claims the benefit under 35 U.S.C. §119(e) of U.S. Provisional Application Ser. No. 61/037,220, filed Mar. 17, 2008.

TECHNICAL FIELD

The invention relates generally to a mobile switching center platform that has a circuit-switched switch and interfaces having functionalities defined by an architecture that provides packet-switched multimedia subscriber services.

BACKGROUND

Many types of communications can be performed over data networks (wireless and/or wireline networks), including electronic mail, web browsing, file downloads, electronic commerce transactions, voice or other forms of real time, interactive communications, and others. To enable the establishment of communications sessions in a network, various control functions are deployed in the network. Some standards bodies have defined subsystems within communications networks that include such control functions. One such standards body is the Third Generation Partnership Project (3GPP), which has defined an Internet Protocol (IP) multimedia subsystem (IMS) protocol that includes various control functions for provision of IP multimedia services, including audio, video, text, chat, or any combination of the foregoing.

An IP multimedia subsystem can be used in conjunction with a wireless access network, such as a wireless access network according to the GSM (Global System for Mobile) or UMTS (Universal Mobile Telecommunications System) standard, as defined by 3GPP, a wireless access network according to the CDMA 2000 (Code Division Multiple Access 2000) standard, as defined by 3GPP2; or other type of wireless access networks. An IP multimedia subsystem can also be used with wireline networks.

An issue associated with deploying IMS services is the cost associated with deploying the infrastructure to implement the IMS services. The infrastructure for deploying IMS services can be complex. The relatively high costs associated with deploying IMS services can cause service providers to delay such deployment.

SUMMARY

In general, according to a preferred embodiment, a mobile switching center platform includes a circuit-switched switch to establish circuit-switched communications sessions on behalf of at least one wireless terminal. The mobile switching center platform also includes interfaces having functionalities defined by a packet-switched multimedia services architecture that provides packet-switched multimedia subscriber services, where at least one of the interfaces is to enable communications with a packet-switched subscriber access network through which the mobile switching center platform establishes packet-switched communications sessions with at least one terminal device.

Other or alternative features will become apparent from the following description, from the drawings, and from the claims.

DETAILED DESCRIPTION OF THE PREFERRED EMBODIMENTS

In the following description, numerous details are set forth to provide an understanding of some embodiments. However, it will be understood by those skilled in the art that some embodiments may be practiced without these details and that numerous variations or modifications from the described embodiments may be possible.

Generally, an enhanced mobile switching center (MSC) platform according to preferred embodiments includes both components for establishing circuit-switched communication sessions as well as interfaces having functionalities defined by a packet-switched multimedia services architecture. The interfaces having functionalities defined by the packet-switched multimedia services architecture allow the enhanced MSC platform to be used to deploy packet-switched multimedia services without having to implement a full infrastructure corresponding to the packet-switched multimedia services architecture, which can be costly.

The interfaces having functionalities defined by the packet-switched multimedia services architecture include at least one interface to enable direct interaction between the enhanced MSC platform and at least one node in a subscriber access network. The subscriber access network can be a wireless network or a wireline network. The provision of the at least one interface to allow interaction between the enhanced MSC platform and the subscriber access network allows the enhanced MSC platform to provide multimedia subscriber services on behalf of user terminals attached to the subscriber access network in a more efficient manner.

In addition to providing interfaces defined by the packet-switched multimedia services architecture, the enhanced MSC platform also includes functions to perform tasks according to the packet-switched multimedia services architecture, where the tasks are to provide the multimedia subscriber services on behalf of the user terminals attached to one or more subscriber access networks.

In one preferred embodiment, the packet-switched multimedia services architecture is the Internet Protocol Multimedia Subsystem (IMS) architecture, as defined by 3GPP (Third Generation Partnership Project). Examples of 3GPP specifications that describe the IMS architecture include 3GPP 22.228 and 23.228. Note that the 3GPP standards body also provides other specifications that relate to IMS services. Although reference is made to the IMS architecture, IMS interfaces, IMS services, and IMS functions in this discussion, it is noted that such reference is intended to cover all future standards that evolve from IMS, whether or not such standards use the IMS designation.

The IMS architecture includes a collection of different functions, linked by standardized interface links. Examples of IMS functions include a home subscriber server (HSS), which is a master database that contains subscription-related information (referred to as subscriber profiles). Another IMS function is a call session control function (CSCF), which is used to process call control signaling such as SIP (Session Initiation Protocol) call signaling. SIP is described in RFC (Request for Comments) 3261, entitled "SIP: Session Initiation Protocol," dated June 2002. Other IMS functions can also be provided.

SIP is an application-layer control signaling protocol for creating, modifying, and terminating multimedia sessions (any one or more of a voice session, audio session, video session, text chat session, or any combination of the foregoing).

More generally, a "packet-switched multimedia services architecture" can refer to any architecture that defines functions that are used to establish and process packet-switched multimedia sessions, as well as functions to perform other tasks. In some preferred embodiments, the functions defined by the packet-switched multimedia services architecture are capable of processing SIP control messages. In other embodiments, the functions defined by the packet-switched multimedia services architecture are used to process control messaging according to other standards (e.g., H.323) for establishing packet-switched communications sessions.

By implementing IMS interfaces in the enhanced MSC platform according to preferred embodiments, a service provider can choose which IMS services and functions to deploy in the service provider's network. This allows the service provider to gradually evolve from traditional networks, such as 2G and 3G networks, to networks that implement IMS services.

According to preferred embodiments, the enhanced MSC platform is evolved from a platform that is able to process just circuit-switched communications to a platform that is able to process both circuit-switched control messaging and IMS-related messaging or SIP messaging. More specifically, according to some embodiments, the enhanced MSC platform includes functions to provide functionality of a SIP server on behalf of SIP-capable terminals that transmit SIP signals to establish packet-switched communications sessions. Examples of services that can be provided by the enhanced MSC platform are IMS-based or SIP-based conference services, call transfer services, call hold services, and use of SIP SUBSCRIBE to receive notification of selected events.

The enhanced MSC platform that provides IMS services on behalf of a terminal can be an MSC in the home network of the terminal or in a visited network of the terminal.

The enhanced MSC platform can delegate certain IMS services to external IMS application servers. As a result, deployment of IMS services is flexible in that a service provider can choose what IMS services to incorporate into the enhanced MSC platform and what services to delegate to application servers.

Figure 1:
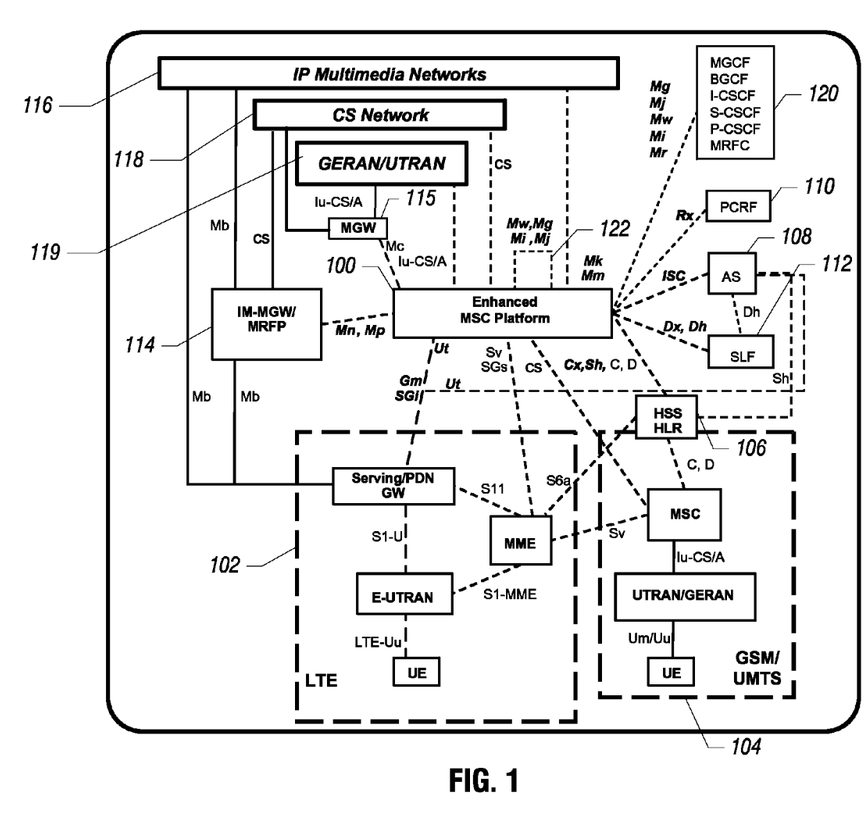
FIG. 1 is a block diagram of an exemplary arrangement in which a preferred embodiment of the invention is incorporated.

FIG. 1 illustrates an exemplary arrangement that includes an enhanced MSC platform 100 according to an embodiment. The enhanced MSC platform 100 is shown with interface links to various entities (including IMS functions). The IMS functions can be deployed in network nodes. Note that there can be more than one IMS function deployed on any particular network node. The interface links that are labeled with bolded and italicized text are new interface links connected to the enhanced MSC platform 100 that are not connected to traditional MSC platforms. The interface links associated with bolded and italicized text are interface links defined by the IMS architecture. The interface links connected to the enhanced MSC platform 100 that are not labeled with bolded and italicized text are existing interface links that are also connected to traditional MSC platforms.

Although the enhanced MSC platform 100 is shown as a single box in FIG. 1, it is noted that the enhanced MSC platform 100 can actually be implemented with one physical system or multiple physical systems, where the multiple physical systems can be spread across different geographic locations.

As shown in FIG. 1, the enhanced MSC platform 100 is connected to a first wireless network 102 and a wireless access network 119. The wireless access network 119 can include, as examples, a UMTS radio access network (UTRAN), a GSM/EDGE radio access network (GERAN) for wireless access by a user terminal or mobile station, a CDMA wireless access network, or any other type of wireless access network. In a different example, the enhanced MSC platform can also be connected to a wireline access network. The wireless networks 102 and 119 and wireline network are examples of subscriber access networks. In the example of FIG. 1, the first wireless network is an LTE (Long-Term Evolution) wireless network, where LTE is a standard defined by 3GPP that seeks to enhance the UMTS (Universal Mobile Telecommunications System) wireless access network. The enhanced MSC platform can also be connected through a GSM/UMTS network 104 in order to serve its access network, where the GSM/UMTS network 104 includes a UTRAN/GERAN and a legacy MSC. Other wireless access networks according to other technologies can also be used, including the CDMA 2000 (Code Division Multiple Access 2000) technology as defined by 3GPP2; the WiMAX (Worldwide Interoperability for Microwave Access) technology, as defined by the IEEE (Institute of Electrical and Electronics Engineers) 802.16 standards; the WiFi wireless access technology, as defined by the IEEE 802.11 standards; and so forth.

The LTE wireless network 102 includes various nodes, including an enhanced UMTS radio access network (E-UTRAN) for wireless access by a user terminal or mobile station (UE), a serving/packet data network gateway (serving/PDN GW), and a Mobility Management Entity (MME). The serving/PDN gateway and MME are considered packet core network nodes of the LTE wireless network 102, while the E-UTRAN is the wireless access node of the LTE wireless network. The serving/PDN gateway routes user data packets between the LTE wireless network 102 and an external network, which in this case includes the enhanced MSC platform 100. The MME is a control node for the LTE wireless network, and the MME is responsible for idle mode tracking of mobile stations and paging procedures, among other tasks.

The MSC in the GSM/UMTS network 104 is connected to an HSS/HLR 106 (home subscriber server/home location register). The HLR is the central database traditionally used in the circuit-switched domain for storing subscriber profiles and other information. The HSS is the equivalent of the HLR in the IMS domain.

The enhanced MSC platform 100 is also connected to the HSS/HLR 106 over the following interface links: Cx, Sh, C, and D. The Cx and Sh interface links are new interface links that would normally not be supported by a conventional MSC platform. In fact, as shown in FIG. 1, the legacy MSC in the GSM/UMTS network 104 is connected by just C, D interface links to the HLR 106.

The Sh interface link between the enhanced MSC platform 100 and the HSS/HLR 106 is an interface link (defined by the IMS protocol) between an application server that is deployed inside the enhanced MSC platform 100 and the HSS/HLR 106. Note that an Sh interface is also provided between the HSS/HLR 106 and an application server (AS) 108 that is provided outside the enhanced MSC platform 100. If no application server is deployed inside the enhanced MSC platform 100, then the Sh interface link would not be provided between the enhanced MSC platform 100 and the HSS/HLR 106.

The Cx interface link (also shown to be between the enhanced MSC platform 100 and the HSS/HLR 106) is normally provided between an I-CSCF or S-CSCF and the HSS, as defined by the IMS protocol. The I-CSCF (interrogating call session control function) is the function within a network that is able to determine the S-CSCF (serving call session control function) with which a user should register. The I-CSCF achieves this by querying the HSS to check that the user is allowed to register in the network. The S-CSCF is the function that registers a user and provides service to the user. The S-CSCF performs routing and translation, provides billing information, maintains session timers, and interrogates the HSS to retrieve authorization, user profiles, and so forth.

In some preferred embodiments, to enhance efficiency, the HSS can be omitted, such that the enhanced MSC platform 100 uses just the HLR. In such embodiments, the enhanced MSC platform 100 manages the subscriber profile for a SIP-capable user terminal using the HLR, instead of using the HSS as specified by the IMS standards. Thus, the HLR according to preferred embodiments can maintain profiles for different types of accesses, including IMS-based accesses, LTE accesses, 2G accesses, and 3G accesses. An enhanced MSC platform that is evolved to support SIP services can continue to obtain subscriber profiles from the HLR and the enhanced MSC platform can map attributes and provide SIP services. By omitting the HSS, the network does not have to provision the user terminal (e.g., mobile station) in both the HLR and HSS, which adds to the complexity of adding the user terminal to the network. Also, by omitting the HSS, steps that would otherwise have to be taken to align (or synchronize) HLR and HSS data can be avoided. Moreover, the need to perform location updates/registrations in both the HLR and HSS can be avoided.

Although omitting the HSS is performed in some preferred embodiments, it is noted that the HSS can be included in other preferred embodiments.

As shown in FIG. 1, the enhanced MSC 100 is also connected over an interface link Rx to a PCRF (policy and charging rules function) 110, which defines charging rules for IMS-related communications between endpoints.

The enhanced MSC platform 100 is connected by an ISC interface link to the application server 108. The application server 108 can perform a predefined IMS service. Although just one application server is shown in FIG. 1, there can be multiple application servers connected to the enhanced MSC platform 100 in a different implementation.

The enhanced MSC platform 100 is connected by a Dx interface link to an SLF (subscription locator function) 112, which provides information about the HSS that is associated with the particular user profile. If a domain contains more than one HSS, the enhanced MSC platform 100 will communicate with the SLF 112 to find the appropriate HSS based on user profile.

The enhanced MSC platform 100 is also connected by various interface links (Mg, Mj, Mw, Mi, Mr) to the various functions. One such function is an MGCF (media gateway control function), which communicates with a CSCF and controls connections for media channels in a media gateway (IM-MGW) that is part of a block represented as 114. An MGCF is used to convert between circuit-switched data and packet-switched data, such as to perform a communications session between a packet-switched network (e.g., IP multimedia network 116) and a circuit-switched network (e.g., CS network 118). The enhanced MSC platform 100 is also connected to the following other functions: BGCF (breakout gateway control function), which is a SIP server that includes routing functionality based on telephone numbers; I-CSCF (explained above); S-CSCF (explained above); P-CSCF (proxy CSCF), which is a SIP proxy that is a first point of contact for a user terminal; MRFC (multimedia resource function controller), which is used in conjunction with an MRFP (multimedia resource function processor) for playing of announcements, media transcoding, and conferencing.

The enhanced MSC platform 100 also includes various functions defined by the IMS architecture that are connected among themselves, as indicated by a dashed line 122 that connects the enhanced MSC platform 100 back to itself. As examples, the enhanced MSC platform 100 can include any one of the functions depicted in box 120.

The enhanced MSC platform 100 is also connected by an SGi interface link (through a packet data network) to the PDN gateway in the LTE enhanced packet core network 102. The SGi interface link transports data packets between the enhanced MSC platform 100 and the PDN gateway of the LTE enhanced packet core network 102. The enhanced MSC platform 100 communicates with a UE through the Gm interface link. The session control protocol on the Gm interface link is based on SIP, as defined by IETF RFC 3261, other IETF RFCs, and additional 3GPP standards. The enhanced MSC platform 100 serves as the IP application server for the user terminal over the Ut interface, which uses HTTP to allow the user to manage service information.

The enhanced MSC platform 100 is connected by Mn and Mp interface links to functions in the block 114, which include an Internet multimedia-media gateway (MGW) and MRFP (multimedia resource function processor). In addition, the enhanced MSC platform 100 is separately connected over an Mc interface link to a media gateway 115 (as conventionally done).

The enhanced MSC platform 100 is also connected by Iu-CS/A interface link to a GERAN/UTRAN 119. The enhanced MSC platform is also connected by a CS (circuit-switched) interface link to the legacy MSC in the GSM/UMTS wireless access network 104. The Iu-CS/A and CS interface links are traditional 2G/3G interface links that are connected to a traditional MSC platform.

Figure 2:
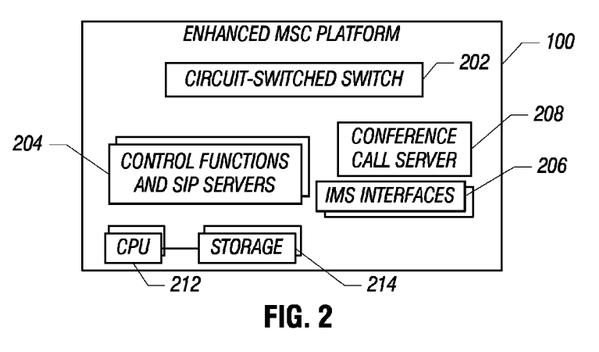
FIG. 2 is a block diagram of an exemplary enhanced mobile switching center (MSC) platform, according to a preferred embodiment.

FIG. 2 shows exemplary components of the enhanced MSC platform 100. A first component is a circuit-switched switch 202, which is used to establish circuit-switched communications between user terminals (e.g., between two wireless mobile stations or between a wireless mobile station and a wired terminal). Note that the circuit-switched switch 202 can be enabled or disabled. If enabled, the circuit-switched switch 202 is able to establish circuit-switched communications. At some point, a service provider may decide circuit-switched communications are no longer necessary, at which point the service provider can cause the circuit-switched switch 202 to be disabled, such as by loading updated software or setting a configuration to disable.

The enhanced MSC platform 100 also includes one or more application servers and control functions 204, which can be any one or more of a P-CSCF, I-CSCF, and/or S-CSCF. Although not shown, the enhanced MSC platform 100 can also include any one of the other IMS functions that are shown to be outside the enhanced MSC platform 100 in FIG. 1. Generally, the enhanced MSC platform 100 is able to provide IP-based multimedia services to packet access user terminals (e.g., SIP-capable user terminals).

The enhanced MSC platform 100 also includes IMS interfaces 206 to communicate over a respective IMS interface links, as shown in FIG. 1, with respective IMS functions.

In addition, the enhanced MSC platform 100 includes a packet-switched (e.g., SIP-based) conference call server 208, which can establish a conference call session on behalf of multiple users. By using the conference call server 208 that is deployed inside the enhanced MSC platform 100, the enhanced MSC platform 100 does not have to involve an external application server, such as application server 108 in FIG. 1, for establishing a conference call, as is normally done. By embedding the conference call server 208, establishing a conference call session is made more efficient. The conference call server 208 is one example of an application server that can be provided within the enhanced MSC platform 100. Other application servers can be used in other embodiments.

The enhanced MSC platform 100 also includes one or more central processing units (CPUs) 212, which is (are) connected to respective storage subsystems 214. Some of the modules of the enhanced MSC platform 100 can be implemented in software, such as the SIP server 204, conference call server 208, IMS interfaces 206, and circuit-switched switch 202. Such software modules are executable on the CPU(s) 212.

As mentioned above, even though the enhanced MSC platform 100 is shown as being provided in one box, it is noted that the enhanced MSC platform 100 in an alternative implementation can be a distributed platform that has multiple physical systems distributed across multiple geographic locations.

Figure 3:
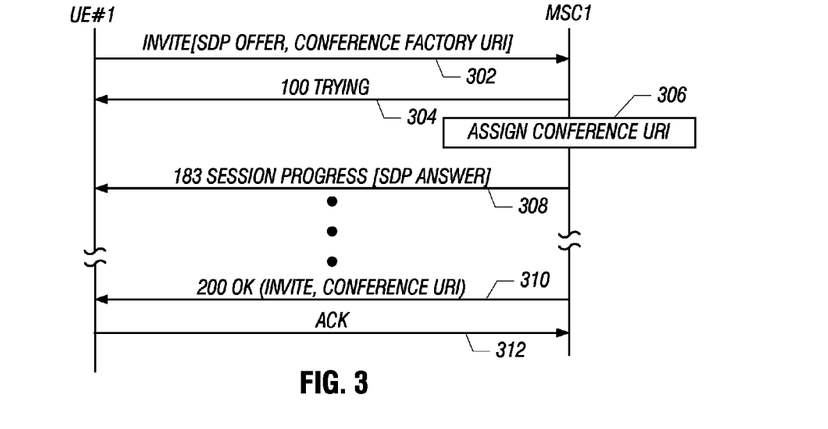
FIGS. 3-5 are exemplary message flow diagrams illustrating establishment of a conference call using the enhanced MSC platform according to a preferred embodiment.

FIG. 3 illustrates a message flow diagram for setting up a conference bridge in response to a request from a first mobile station (UE#1). The conference bridge is set up at a serving MSC platform (MSC1) for the first mobile station. The serving MSC platform MSC1 is configured similarly to the enhanced MSC platform 100 depicted in FIGS. 1 and 2.

To set up the conference bridge, the first mobile station sends (at 302) a SIP INVITE message to its serving MSC platform (MSC1). The serving MSC that provides the conference service can be the home MSC or a visited MSC for the first user terminal.

The INVITE message sent at 302 may contain an SDP Offer that contains the connection information. In addition, the INVITE message may contain a Conference Factory URI (uniform resource identifier) in the Request URI field of the INVITE message. The Conference Factory URI is an identifier to indicate to MSC1 that a conference service is requested. In an alternative implementation, another indication can be used to indicate that a conference service is requested.

In response to the INVITE message, MSC1 sends back (at 304) a SIP 100 TRYING message, which indicates that the request has been received by MSC1. MSC1 recognizes from the Conference Factory URI that a conference service is requested. MSC1 can verify from the first user's profile (such as the profile in the HLR or HSS) that the first user is authorized to establish the conference service. If so authorized, the MSC 1 assigns (at 306) a conference URI, which is an identifier of the conference bridge that is to be established in response to the INVITE request. The conference URI is returned to the first mobile station (UE#1) so that the first mobile station can send the conference URI to other user terminals that the originating user wishes to invite to the conference call. Note that assignment of a conference URI is performed by the conference call server 208 in the enhanced MSC platform. This is contrasted to conventional techniques in which assignment of the conference URI would have been performed by a conference call application server that is outside the MSC.

The MSC1 further sends (at 308) a SIP 183 SESSION PROGRESS message to the first mobile station to indicate that session establishment is progressing. Following additional messaging defined by the 3GPP standards (not shown), MSC1 sends (at 310) a 200 OK message, which is an indication that the INVITE request (sent at 302) has succeeded. The 200 OK message contains the conference URI (assigned by MSC1) in the contact header of the 200 OK message.

The first mobile station responds to the 200 OK message by sending (at 312) a SIP ACK message. At this point, the conference bridge has been established. The assigned conference URI will direct other invited user terminals to access MSC1 to participate in the conference call established by the originating user.

Figure 4:
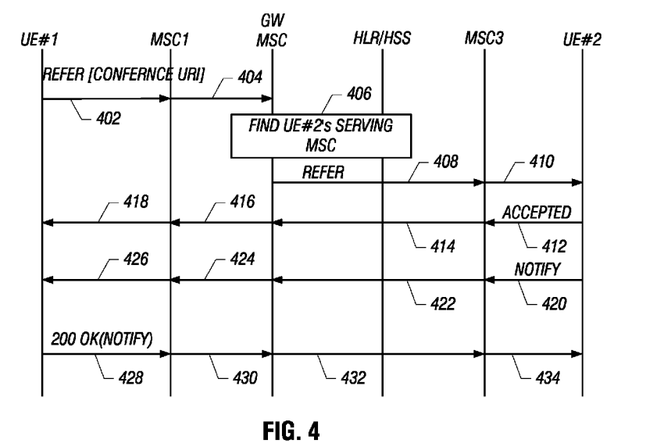

FIG. 4 illustrates a message flow diagram in which the first user terminal (UE#1) invites a second user terminal (UE#2) to the conference call. In the example, the first user terminal sends a SIP REFER message (at 402) to MSC 1 (which is the serving MSC). The REFER message is described in RFC 3515, entitled "The Session Initiation Protocol (SIP) Refer Method" dated April 2003.

MSC1 in turn sends the REFER message (at 404) to a gateway MSC, which can also be an enhanced MSC platform similar to platform 100 depicted in FIGS. 1 and 2. The REFER message contains a REFER-To header with the conference URI (assigned by MSC1 in FIG. 3). Also, a method parameter in the REFER message is set to INVITE. The gateway MSC finds (at 406) the serving MSC of the second user terminal by accessing the HLR/HSS (e.g., 106 in FIG. 1). It is assumed that the serving MSC for the second user terminal is MSC3, which can also be an enhanced MSC platform similar to the platform 100 shown in FIGS. 1 and 2.

Next, the gateway MSC forwards (at 408) the REFER message to MSC3, which in turn sends the REFER message (at 410) to the second user terminal (UE#2). In response to the REFER message, the second mobile station sends (at 412) a SIP ACCEPTED message to MSC3, which forwards (at 414) the ACCEPTED message to the gateway MSC, which in turn forwards (at 416) the ACCEPTED message to MSC1, which then sends (at 418) the ACCEPTED message to the first user terminal.

Next, the second user terminal sends (at 420) a SIP NOTIFY message, which is to inform the first user terminal of the status of the reference initiated by the REFER message sent by the first user terminal. The NOTIFY message is forwarded from MSC3 through the gateway MSC and MSC1 to the first user terminal (at 422, 424, 426).

In response, the first user terminal acknowledges the NOTIFY message by sending a 200 OK message (at 428), which is sent through MSC1, the gateway MSC, and MSC3 to the second user terminal (at 430, 432, 434). At this point, the second user terminal has been invited to the conference call.

If there are other user terminals that are to be invited to the conference call, a similar exchange of messages can be made with such other user terminals.

Figure 5:
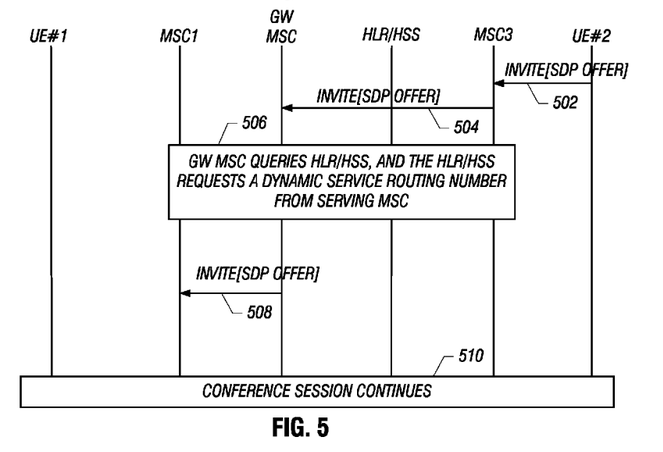

FIG. 5 is a message flow diagram of a process by which the second user terminal joins the conference bridge. The second user terminal (UE#2) sends (at 502) an INVITE message to its serving MSC (MSC3). Following various SIP messages responsive to the INVITE message sent at 502 (which are not shown for purposes of brevity), the serving MSC (MSC3) forwards the INVITE message (at 504) to the gateway MSC. Upon receiving the INVITE message, the gateway MSC queries the HLR/HSS, and the HLR/HSS responds to this query by requesting a dynamic service routing number from the serving MSC (MSC1) for the first user terminal. This dynamic service routing number allows the session to be routed to the serving MSC (MSC1) where the conference bridge was allocated.

The above is a first solution in which a range of directory numbers (e.g., MSISDNs) is associated with a serving MSC, such as the MSC1. These directory numbers are specific to the conference service. The conference URI, which was provided by the serving MSC (MSC1) to the first user terminal in the contact header of the 200 OK message (310 in FIG. 3), is associated with one of the directory numbers. When other participants try to terminate to the conference URI, the gateway MSC queries a database (e.g., HLR/HSS), which then requests a dynamic service routing number from the serving MSC (MSC1), as illustrated in 506 in FIG. 5. The number of routing numbers allowed for the set of MSISDNs is engineered based on the maximum number of calls that can simultaneously be in the process of being set up to the conference service.

A second solution according to a different embodiment is a simplification of the first solution. In the second solution, the serving MSC (MSC1) directly allocates the dynamic service routing number and associates this number with the conference URI that was provided to the first user terminal in the contact header of the 200 OK message (310 in FIG. 3). When another participant sets up a session to the dynamic service routing number, the translation and the routing of this number leads the session directly to the serving MSC (MSC1) and the conference in question. The number of routing numbers allowed per serving MSC is engineered as discussed above.

Once the gateway MSC receives the dynamic service routing number from the HLR/HSS that allows the session to be routed to MSC1, the gateway MSC next sends (at 508) the INVITE message to MSC1. Using the dynamic service routing number and other session control data, MSC1 adds the participant to the conference bridge. At this point, the conference call session continues (at 510).

If other participants wish to join the conference call session, a similar exchange as depicted in FIG. 5 can be performed for such other participants.

In FIGS. 4 and 5 above, tasks 406 and 506 involve the gateway MSC platform querying the HLR/HSS. In some preferred embodiments, the HSS can be omitted, such that the gateway MSC is querying the HLR for establishing an IMS service, which in this example is for establishing a packet-switched conference call. By going to the HLR directly instead of the HSS, the message exchanges that would normally be involved in accessing the HSS (such as message exchanges with the S-CSCF and I-CSCF) can be avoided for enhanced efficiency.

The approach of using the HLR instead of the HSS for performing IMS services by the enhanced MSC platform can be performed in other contexts as well.

Figure 6:
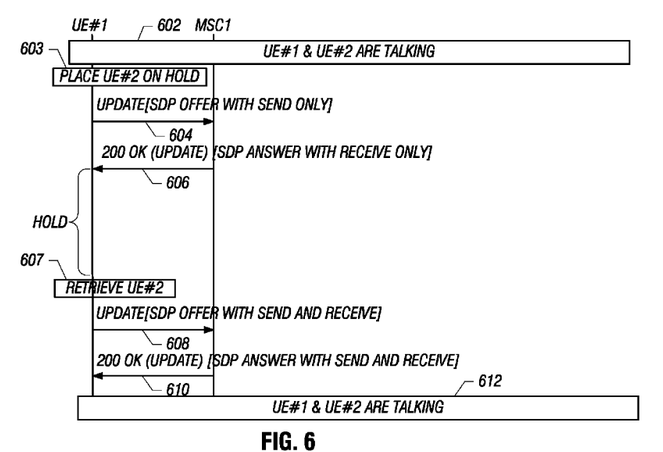
FIG. 6 is an exemplary message flow diagram of a process of performing call hold and retrieve using the enhanced MSC platform, according to a preferred embodiment.

FIG. 6 illustrates an exemplary message flow diagram for placing a session on hold and later retrieving the session. Initially, the first user terminal (UE#1) and the second user terminal (UE#2) are talking (at 602). At some point, the first user may decide to place (at 603) the call on hold. As a result, the first user terminal sends (at 604) a SIP UPDATE message that contains a SDP OFFER to MSC1, where the SDP OFFER indicates that the mode of the session has been changed from Send and Receive to Send Only. MSC1 responds to the UPDATE message with a 200 OK message (at 606), which contains an SDP Answer with Receive Only. At this point, the session has been placed on hold.

At a later point in time when the first user wishes to take the call off hold (in other words, to retrieve at 607 UE#2), the first user terminal sends (at 608) an UPDATE message to MSC1, where the UPDATE message contains an SDP OFFER that indicates that the mode is to be changed from Send Only to Send and Receive, which indicates that bi-directional communication is to continue. MSC1 responds with a 200 OK message (at 610), at which point the first and second users can start talking again.

Another feature that can be provided by the enhanced MSC platform according to some embodiments is that certain DNS (domain name server) queries can be avoided during registration of a IMS-compliant user terminal. If information associated with the user terminal is already provisioned in the enhanced MSC platform, then a DNS query does not have to be performed during registration of the user terminal. This feature of avoiding DNS queries can also be implemented in a P-CSCF outside the enhanced MSC platform, according to an alternative embodiment.

Figure 7:
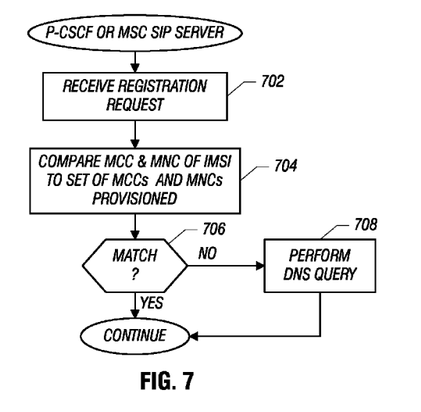
FIG. 7 is an exemplary message flow diagram of a process of handling a registration request, according to a preferred embodiment.

FIG. 7 illustrates a process of deciding whether or not a DNS query should be issued in response to a registration request. The registration request is received (at 702) from the user terminal by the enhanced MSC platform (or P-CSCF). The registration request contains the IMSI (International Mobile Subscriber Identifier) of the registering user terminal. The IMSI can contain a mobile country code (MCC) and a mobile network code (MNC). The enhanced MSC platform or P-CSCF compares (at 704) the MCC and MNC of the IMSI in the registration request with a set of MCCs and MNCs provisioned in the enhanced MSC platform or the P-CSCF.

If there is a match, as determined at 706, then a DNS query does not have to be issued to obtain the I-CSCF address, since (1) this node is the home MSC or a P-CSCF that is collocated with the home S-CSCF, or (2) this node is a visited node that is chosen to perform functions as if the user terminal was in its home network.

If it is determined at 706 that MCC and MNC of the IMSI in the registration request does not match the set of MCCs and MNCs provisioned in the enhanced MSC platform or P-CSCF, then a DNS query is performed (at 708) to find the I-CSCF address, after which the registration procedure continues as defined by IMS. For example, if the user terminal from an IMS network has roamed to the enhanced MSC platform and the MCC and MNC of the user terminal's IMSI do not match the MCCs and MNCs provisioned in the enhanced MSC platform, the resulting DNS query will result in the registration being sent to the home network of the user terminal.

If the user terminal has roamed from an MSC to an IMS network and the MCC and MNC of the user terminal's IMSI do not match the set of MCCs and MNCs provisioned in the P-CSCF, a DNS query will be performed to find the I-CSCF address, resulting in the registration request being routed to an MSC acting in the role of that I-CSCF.

The various tasks described above can be executed by software. Instructions of such software can be loaded for execution on a processor. The processor includes microprocessors, microcontrollers, processor modules or subsystems (including one or more microprocessors or microcontrollers), or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A mobile switching center platform, comprising:
   a circuit-switched switch configured to establish circuit-switched communications sessions on behalf of at least one wireless terminal;
   interfaces having functionalities defined by an architecture that provides packet-switched multimedia subscriber services, wherein at least one of the interfaces is configured to enable the mobile switching center platform to communicate with a packet-switched subscriber access network for establishing packet-switched communications sessions; and
   a packet-switched conference call server configured to establish a packet-switched conference call involving multiple user terminals, wherein the mobile switching platform is configured to provide a dynamic service routing number for a conference service established by the conference call server, wherein the dynamic service routing number enables a participant to route to the conference service of the mobile switching center platform.

2. The mobile switching center platform of claim 1, wherein the mobile switching center platform is configured to establish packet-switched communications sessions through the subscriber access network with at least one terminal device.

3. The mobile switching center platform of claim 1, wherein the mobile switching center platform is configured to access a Home Location Register (HLR) to perform a subscriber service relating to a packet-switched communications session.

4. The mobile switching center platform of claim 1, wherein the at least one interface is a Gm interface link.

5. The mobile switching center platform of claim 1, wherein the packet-switched multimedia services architecture includes an Internet Protocol Multimedia Subsystem (IMS) architecture, and wherein at least one of the interfaces is configured to enable the mobile switching center platform to interact with IMS functions running in peer nodes.

6. The mobile switching center platform of claim 1, further comprising one or more IMS functions.

7. The mobile switching center platform of claim 6, wherein the one or more IMS functions include a call session control function.

8. The mobile switching center platform of claim 1, further comprising a Session Initiation Protocol (SIP) server configured to provide subscriber services.

9. The mobile switching center platform of claim 1, wherein the subscriber access network is a wireless network, and wherein the interfaces include an interface configured to communicate with at least one node of the wireless network.

10. The mobile switching center platform of claim 9, wherein the interfaces includes an interface to communicate with at least one node of a Long-Term Evolution (LTE) wireless network.

11. The mobile switching center platform of claim 1, further comprising:
    a function configured to provide IP-based multimedia subscriber services to packet access user terminals.

12. The mobile switching center platform of claim 1, wherein the circuit-switched switch is configured to establish circuit-switched communications sessions with at least one of a UMTS radio access network (UTRAN), a GSM/EDGE radio access network (GERAN), and a CDMA wireless access network.

13. A mobile switching center platform, comprising:
    a circuit-switched switch configured to establish circuit-switched communications sessions on behalf of at least one wireless terminal;
    interfaces having functionalities defined by an architecture that provides packet-switched multimedia subscriber services, wherein at least one of the interfaces is configured to enable the mobile switching center platform to communicate with a packet-switched subscriber access network for establishing packet-switched communications sessions; and
    wherein the mobile switching center platform is configured to receive a registration request containing an identifier of a user terminal, compare information in the identifier with information in the mobile switching center platform, and in response to the information in the identifier matching the information in the mobile switching center platform, decide to not send a domain name system (DNS) query.

14. A method, comprising:
    a user terminal requesting establishment of a session to a dynamic service routing number associated with a conference call, wherein the dynamic service routing number is provided by a packet-switched conference call server within a mobile switching center platform, wherein the dynamic service routing number enables a participant to route to a conference service established by the packet-switched conference call server; and
    the user terminal participating in the conference call via the session.

15. A method, comprising:
    a user terminal establishing a connection to a mobile switching center platform; and
    the user terminal providing, to the mobile switching center platform, a registration request that specifies an identifier of the user terminal, wherein the mobile switching center platform is configured to compare information in the identifier with information in the mobile switching center platform, and in response to the information in the identifier matching the information in the mobile switching center platform, decide to not send a domain name system (DNS) query.

* * * * *